(12) United States Patent
Hockenberry et al.

(10) Patent No.: US 7,865,875 B2
(45) Date of Patent: Jan. 4, 2011

(54) PROGRAMMING TOOLKIT FOR DEVELOPING CASE MANAGEMENT SOFTWARE APPLICATIONS

(75) Inventors: David R. Hockenberry, Friedens, PA (US); Donald Gene May, Jr., Johnstown, PA (US); Natarajan Sridhar, Windber, PA (US); Kamal V. Gella, Johnstown, PA (US)

(73) Assignee: Concurrent Technologies Corporation, Johnstown, PA (US)

( * ) Notice: Subject to any disclaimer, the term of this patent is extended or adjusted under 35 U.S.C. 154(b) by 1051 days.

(21) Appl. No.: 11/640,602

(22) Filed: Dec. 18, 2006

(65) Prior Publication Data

US 2007/0174810 A1 Jul. 26, 2007

Related U.S. Application Data

(60) Provisional application No. 60/751,248, filed on Dec. 16, 2005.

(51) Int. Cl.
*G06F 9/44* (2006.01)
*G06Q 10/00* (2006.01)

(52) U.S. Cl. ............... 717/120; 717/104; 717/107; 717/101; 705/301

(58) Field of Classification Search .............. 717/104, 717/120
See application file for complete search history.

(56) References Cited

U.S. PATENT DOCUMENTS

| 5,668,998 | A | * | 9/1997 | Mason et al. ............... 717/104 |
| 5,900,871 | A | * | 5/1999 | Atkin et al. ................ 715/866 |
| 6,684,383 | B1 | * | 1/2004 | Natori et al. ............... 717/107 |
| 2003/0135842 | A1 | * | 7/2003 | Frey et al. .................. 717/121 |
| 2006/0271910 | A1 | * | 11/2006 | Burcham et al. ............ 717/105 |
| 2007/0180066 | A1 | * | 8/2007 | Sherwood et al. .......... 709/220 |

\* cited by examiner

*Primary Examiner*—Thomas K Pham
(74) *Attorney, Agent, or Firm*—Buchanan Ingersoll & Rooney PC

(57) ABSTRACT

A robust toolkit that can be configured and assembled in an object-oriented manner to develop a custom case management software application. The toolkit provides a set of software components that serve as a framework for integration with off-the-shelf components. The software components are organized in a vertical layered architecture, with each layer depending upon the layers below it. The toolkit includes a top enterprise application layer, a middle case management application layer, and a bottom customized application layer. The toolkit allows developer to focus on meeting the specific case management needs of a target business/organization, instead of developing case management business logic and application logic from the ground up.

25 Claims, 15 Drawing Sheets

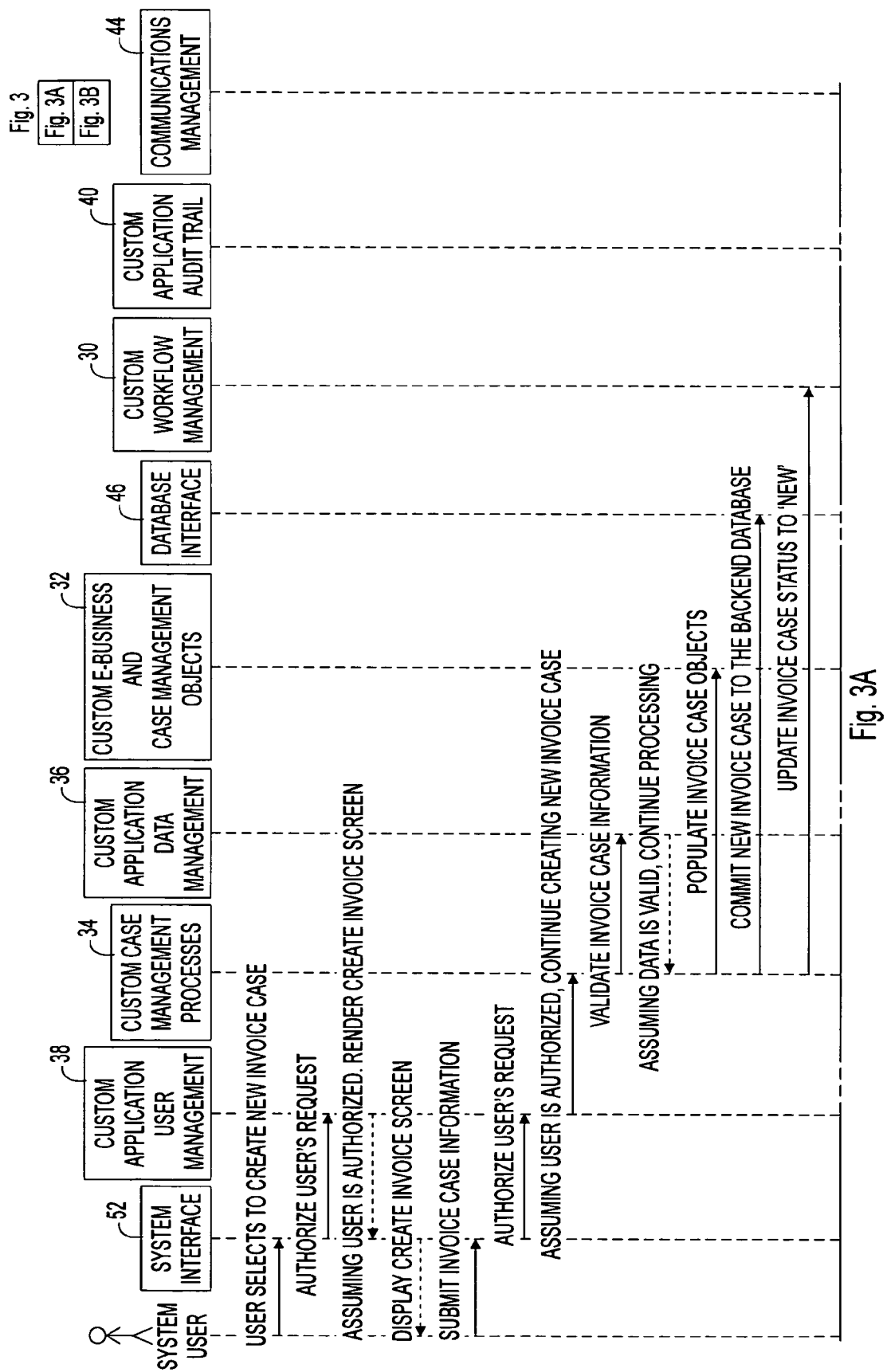

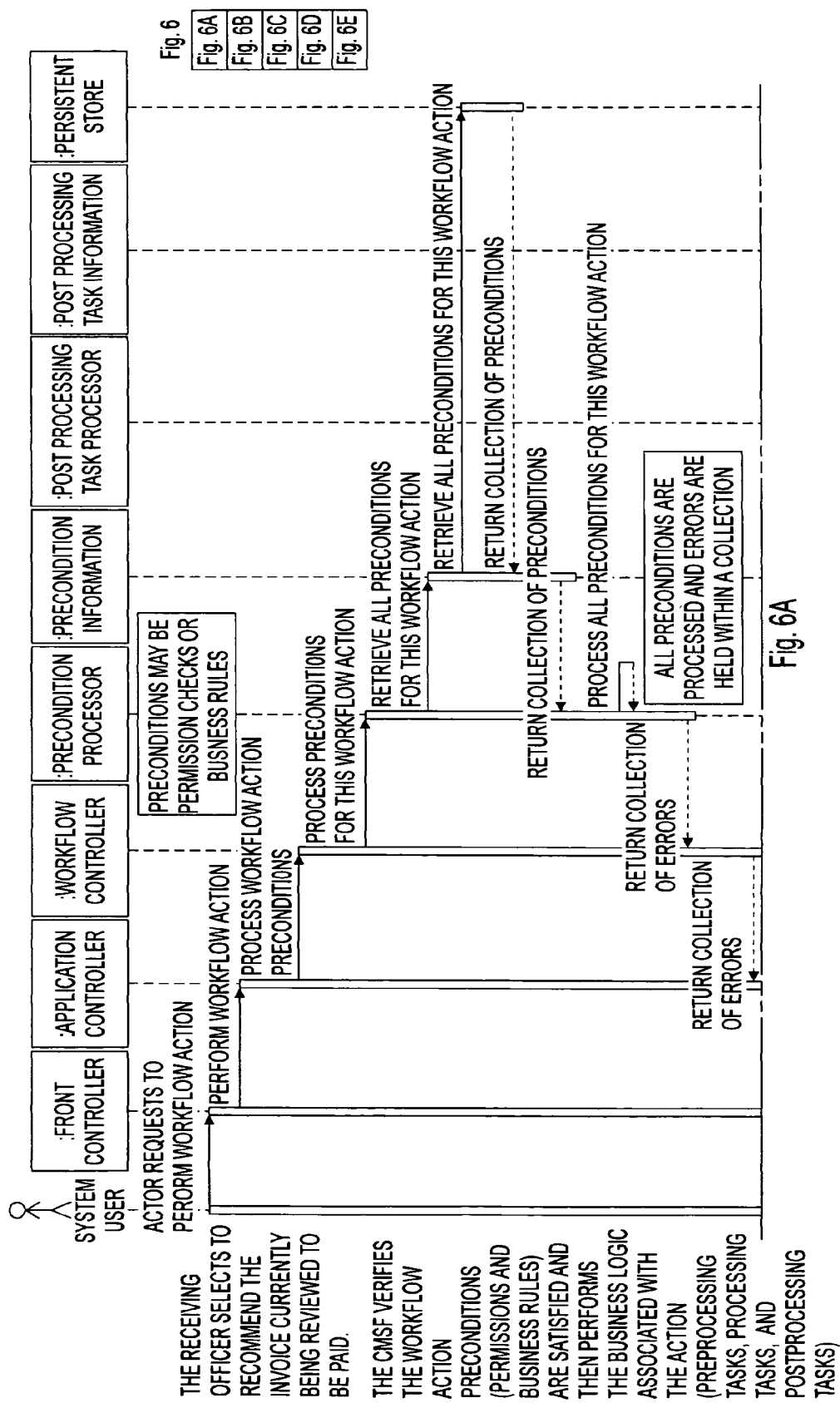

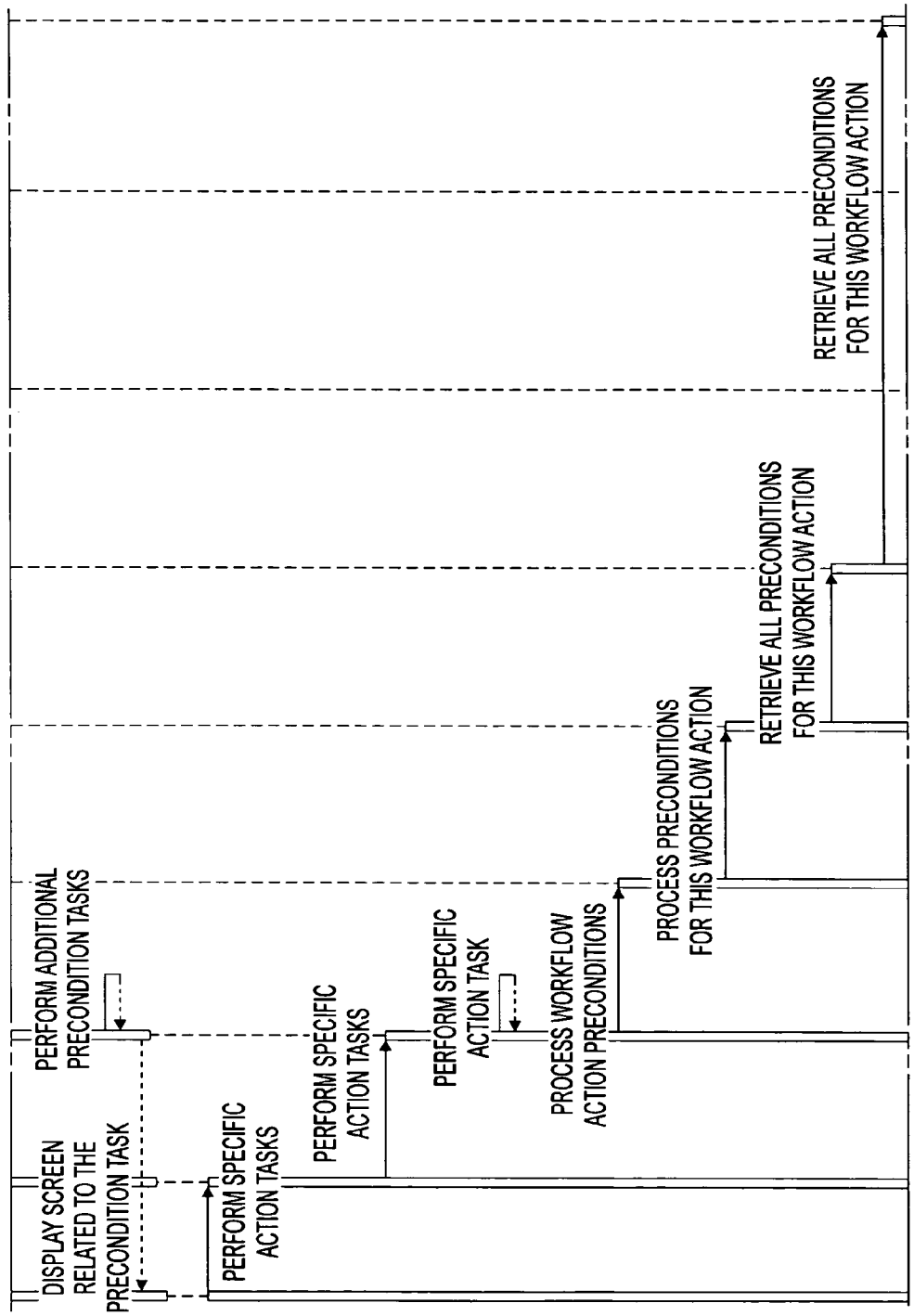

```
public class MyDataStoreDAOFactory extends DAOFactory
{
        public WorkflowDAO getWorkflowDAO ( )
        {
                return new MyDataStoreDAO ( )
        {
}
```

Fig. 8

```
public static final int ORACLE              = 1;
public static final int SQL_SERVER           = 2;
public static final int MY_DATA_STORE        = 3;

public static DAOFactory getDAOFactory ( ) throws Exception
{
        switch (persistentStoreType)
        {
                case ORACLE:
                        return new OracleDAOFactory ( );
                case SQL_SERVER:
                        return new SQLserverDAOFactory ( );
                case MY_DATA_STORE:
                        return new MyDataStoreDAOFactory ( );
                default:
                        throw new Exception ( "Persistent Store Type is invalid
                                ( PersistentStoreType = " + persistentStoreType + " ) " );
        }
}
```

Fig. 9

```
Database Properties ###

# Indicate which persistent store is to be used.
# 1 = Oracle
# 2 = SQL server
# 3 = My Data Store
persistentStore = 3

Database driver

DBDriver = <specific database driver for "My Data Store" >
#DBDriver = oracle . jdbc. driver . OracleDriver
#DBDriver = com . microsoft . jdbc . sqlserver . SQLServerDriver

# Database connection string
DBURL = <specific database connection string for "My Data Store" >
#DBURL = jdbc : oracle : thin : @ServerName : 1521 : orcl

# Database Username and Password
DBUsername = username
DBPassword = password

# Minimum and maximum database connections for the database pool.
DBPoolMin = 1
DBPoolMax = 15

End Database Properties ###
```

Fig. 10

PROGRAMMING TOOLKIT FOR DEVELOPING CASE MANAGEMENT SOFTWARE APPLICATIONS

CROSS-REFERENCE TO RELATED APPLICATIONS

This application claims the benefit of co-pending provisional patent application Ser. No. 60/751,248 entitled "E-Invoicing Case Management System", filed on Dec. 16, 2005, the entire disclosure of which is incorporated by reference herein.

FIELD OF THE INVENTION

The present invention is directed toward a toolkit for developing software applications and, more particularly, toward an integration framework that enables developers to use, customize and integrate the toolkit components with other "off-the-shelf" software components to develop custom case management software applications.

BACKGROUND OF THE INVENTION

Currently, an array of software products are available that are packaged and marketed as case management software. The majority of these software products are focused on medical and legal case management applications. Although these software products offer a wide range of features, they support a limited degree of customization, which typically results in an impedance mismatch between the software's capabilities and a business's case management needs. Businesses that choose to utilize the available software applications are forced to raise their implementation costs by either changing their current business processes and information systems for managing cases or sponsoring the modification of the software products by the software vendors to suit the business's particular needs.

In an increasingly paperless and automated world, the concept of case management is finding application outside the legal and medical fields. For example, accounts payable business units are identifying electronic invoicing requirements that strongly indicate a need for financial case management software. However, each business will typically require its own customization to the case management software, which is not available in current software products without additional expense.

The current case management software market is a heterogeneous mix of software products aimed at specific vertical markets, (e.g., medical, legal), with limited capability for customization and no viability to be adopted for a different vertical market despite the significant commonality of capabilities/features across case management software products.

The present invention is directed toward overcoming one or more of the above-identified problems.

SUMMARY OF THE INVENTION

The present invention addresses the requirements to segregate the automation of a business's custom case management processes from the development and integration of software capabilities and features that are common to case management software applications, such as, but not limited to:

Ancillary case documentation.
Audit trails.
Batch input of multiple case data.
Case status tracking.
Case data archiving.
Case searching.
Controlled access.
Electronic notifications.
Interfacing/interoperability with Legacy systems.
Report generation.
System administration.
Workflows for processing cases.
User input of single case data.

The present invention provides a foundation for the rapid development of custom, complex and robust case management software applications at a low cost. The inventive framework provides an open architecture for customization that provides optimal performance, and includes security features for the safeguarding of application and business data. The present invention provides significant advantages over commercial off-the-shelf software tools by enabling true customization to requirements versus forcing users to change their requirements to conform to a software tool.

The inventive toolkit is designed for use as the foundation for developing a custom case management software application. The inventive toolkit provides the following advantages, which help to minimize the engineering life cycle.

An architectural design which reduces application design effort. Using the inventive framework provides software architects and developers with a starting blueprint for developing a custom case management software application. The inventive framework embodies best-of-breed architecture and design principles by implementing object-oriented architectural and design patterns.

Coded modules which reduce coding and implementation effort. The inventive framework provides a library of coded and tested components. These components may be abstract or concrete, and contain implementations of core methods. Abstract components serve as the parent components for developing specialized components via inheritance (an object-oriented programming principle). Concrete components can be used as is. This saves the developer significant code development effort.

Tested modules which reduce testing effort. The inventive toolkit components are well tested, which enables developers to focus on developing and testing specialized components that perform custom case management business functions.

A modular architecture which reduces maintenance efforts. The inventive toolkit components are organized in a vertically layered architecture, thereby minimizing the impact of maintenance changes. For example, changes to components in one layer will not impact the performance or functioning of components in layers below.

A robust and stable framework for developing case management software applications which reduces risks. The customizable inventive toolkit components have evolved through various cycles of testing and refinements, thus providing a robust and stable framework for developing custom case management software applications.

Other objects, aspects and advantages of the present invention can be obtained from a study of the specification, the drawings, and the appended claims.

BRIEF DESCRIPTION OF THE DRAWINGS

FIG. 8 is a listing illustrating an object-oriented extension of the inventive toolkit's DAOFactory;

FIG. 9 is a listing illustrating a method from the inventive toolkit's DAOFactory; and FIG. 10 is a listing illustrating an excerpt from the inventive toolkit's database configuration file.

DETAILED DESCRIPTION OF THE INVENTION

Figure 1:
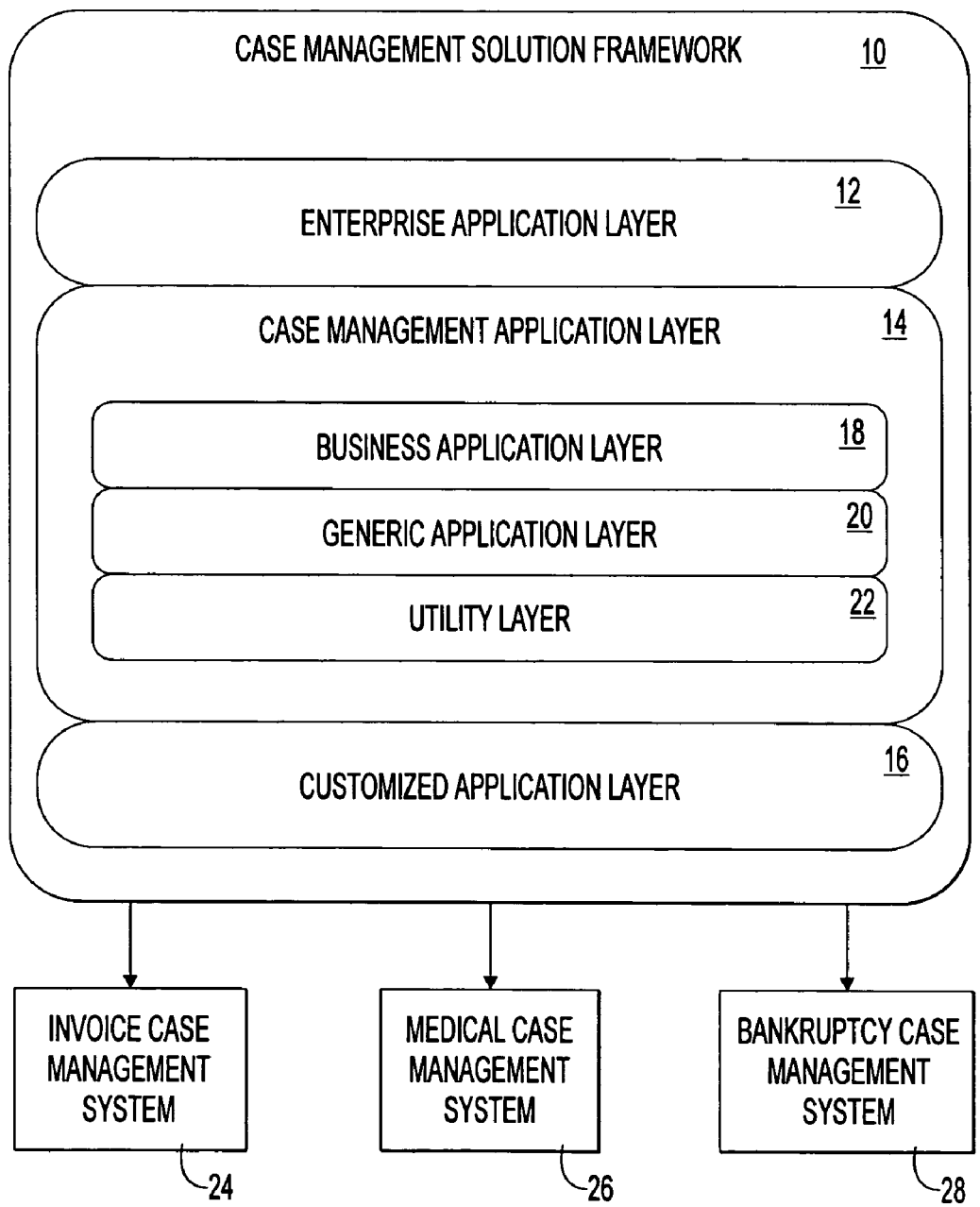
FIG. 1 is an architectural diagram illustrating the various layers of the toolkit of the present invention.

FIG. 1 illustrates an architectural diagram of the inventive toolkit (also referred to as the case management solution framework), shown generally at 10. The inventive toolkit is composed of various layers, including an enterprise application layer 12 (top layer), a case management application layer 14 (middle layer) and a customized application layer 16 (bottom layer). The case management application layer 14 includes, as sub-layers, a business application layer 18, a generic application layer 20 and a utility layer 22. The layers are arranged in a vertical manner, such that changes to one layer will not impact the performance or functioning of any of the layers below it. Combining these logical layers creates a foundation or framework that allows organizations to quickly implement an enterprise case management system, using object-oriented techniques) with a focus on any case type (business, financial, medical, etc.). For example, as shown in FIG. 1, the various layers can be implemented to develop an invoice case management system 24, a medical case management system 26, a bankruptcy case management system 28, or any other type of case management system desired by a particular business.

The enterprise application layer 12 is the top layer of the inventive toolkit 10 and provides administration, security and communications capabilities. The administration capabilities of the enterprise application layer 12 are typically customized and/or configured to leverage the capabilities of an Off-The Shelf ("OTS") web/application server and an OTS database server. Administration is performed by using a combination of various methods and techniques, including, but not limited to, administration tools embedded within the above OTS products, standard system and user administration GUI screens, and/or configuration files.

The security of case management systems developed using the inventive toolkit 10 and the data contained within those systems are protected by security measures employed by the enterprise application layer 12 to ensure data privacy and integrity. The case data and related information owned by separate organizations or departments using the same case management system is logically separated. Consequently, users from one specific organization only have access to data owned by their organization. They do not have access to data owned by other organizations. Additionally, the enterprise application layer implements a role base permission scheme which entails protecting system functionality and data by assigning access rights (e.g., read, update, delete, execute, etc.) to system user roles. Only a user with a system administrator role has the ability to administer users and their system roles.

The enterprise application layer 12 also enforces strict password standards. Personal and sensitive but unclassified data, such as passwords, Social Security numbers and dates of birth, are typically encrypted when stored within the backend data store, which is typically an OTS database server. Only the owners of this information and the authorized users have access to this information.

Preventive measures to decrease the possibility of user session high-jacking are also included in the security capabilities within the enterprise application layer 12. User identifying information, such as user name and IP address, are checked with each session request to validate the source. A rotating session token scheme is utilized by the enterprise application layer 12 to mitigate the success of a session high-jacking attack.

The enterprise application layer 12 also supports communications with enterprise systems using various communication technologies/products and protocols. Enterprise users can use web browsers (such as, but not limited to, Internet Explorer, Netscape and Firefox), to communicate with the enterprise application layer 12 via a host OTS web application server implementation of HTTP and/or HTTPS protocols.

Figure 2:
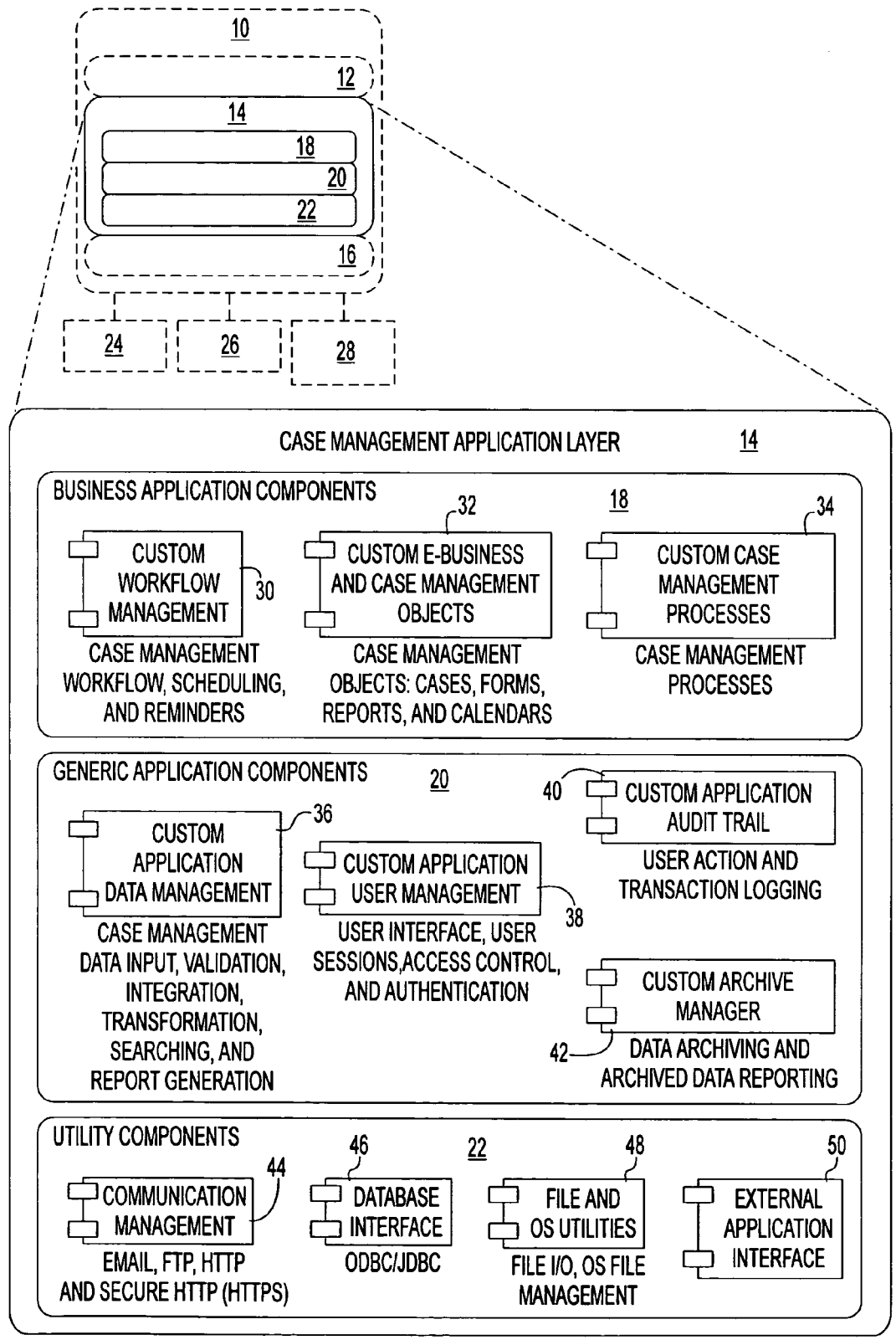
FIG. 2 is an expanded view of FIG. 1 illustrating the various components of the sub-layers of the case management application layer of the present invention.

The middle layer of the inventive framework 10 is the case management application layer 14, which provides case management business classes, processes/workflows and other related functions. The case management application layer 14 includes three sub-layers, namely, the business application layer 18, the generic application layer 20 and the utility layer 22. The business application layer 18 encapsulates case management workflows, business entities and processes. The general application layer 20 encapsulates application data management, user management, application action auditing and data archiving. The utility layer 22 is capable of handling communications, files, database interfaces and external application interfaces. As shown in FIG. 2, each of the business application 18, generic application 20 and utility 22 layers includes various components which are utilized by developers (using object-oriented techniques) in developing a resultant case management system.

FIG. 2 is an expanded view of the business application 18, generic application 20 and utility 22 layers illustrating the various components therein. As shown in FIG. 2, the business application layer 18 includes a custom workflow management component 30, a custom e-business and case management objects component 32 and a custom case management processes component 34. The generic application layer 20 includes a custom application data management component 36, a custom application user management component 38, a customer application audit trail component 40 and a custom archive manager component 42. The utility layer 22 includes a communication management component 44, a database interface component 46, a file and OS utilities component 48 and an external application interface component 50. The functionality of these various components is described below.

The business application components 30, 32 and 34 encapsulate specific case management business logic. The custom workflow management component 30 is utilized for coordinating a series of scheduled actions/events on a case involving various business users. The custom workflow management component 30 is capable of scheduling, managing and tracking actions and events that are sequence driven, or those actions and/or events that occur in parallel. Component 30 also generates reminders alerting users of upcoming events, and also manages when an alert for a component should be sent and which business users will receive the alert.

The custom e-business and case management objects component 32 is utilized for representing case management related entities, such as cases, forms, reports, documents, calendars, etc. Component 32 also includes business objects that contain centralized business logic specific to case management. This logic includes, but is not limited to: (a) conditions for generating messages, warnings and errors; (b) summing totals and counts; (c) maintaining links between cases and related case data (such as forms, reports, documents, etc.); and (d) controlling business transactions and handling exceptions when a transaction fails.

The custom case management processes component 34 is utilized for defining and executing system operation/administration and case management processes. Component 34 includes representations of scheduled as well as event-driven processes related to: (a) case data submission, editing and closing; (b) various scheduled system maintenance and administrative events, such as data backups, monitoring activity of user sessions, etc.; (c) communication processes (e.g., periodic generation of e-mail notifications); and (d) external system interface processes (e.g., periodic synchronization of data with an external database).

The generic application components 36, 38, 40 and 42 contain generic and customizable system logic that is common across case management applications. The custom application data management component 36 is utilized for custom data input, integration/synthesis, validation, transformation, querying/searching and report generation. Component 36 provides the foundation for defining an interface with a user and/or system for the input of case management data. The system logic associated with the custom application data management component 36 includes the ability to map or integrate form fields and elements to business objects (representation of business entities within the application). Component 36 can also be designed to validate individual field data fields in accordance with various business rules, such as data type (e.g., numeric, alpha, alpha-numeric, data, etc.), minimum and maximum field lengths, field-to-field relationships (e.g., "Start Date" should not be later than "End Date"), as well as parent and child record relationships. Component 36 can accept a user's keyword or a natural text query, and force the query into a format suitable for searching the back-end database. Component 36 can also be utilized to administer or generate standard reports. Report administration typically involves creating, editing and deleting standard reports, while report generation typically includes populating a standard report based on specific query/search criteria selected by a user. The custom application data management component 36 can also translate/transform data from/to an external data source, as well as log any validation error messages.

The custom application user management component 38 is utilized for managing the user interface, user sessions, user access control and user authentication. Component 38 includes system logic to handle interfacing with the end user of the application via a Graphical User Interface ("GUI") "template" paradigm, which allows the user interface to be divided into smaller, manageable sub-screens (e.g., title, menu, main body, footer, etc.). These individual sub-screens are individually managed which allows parallel development and less duplication of presentation logic. The sub-screens are then brought together at one time to create a complete screen that is viewed by the end user. The user session management functionality of component 38 tracks users logging into and out of the case management application, how long a user was logged into the case management application, and also manages the time-out of an individual user's session. The access control functionality of component 38 utilizes a role-based architecture to manage what data and functionality users may access within the case management application. The user authentication functionality of component 38 contains common logic to authenticate users or external systems based on digital certificates and/or user name/password pairs. Component 38 also provides the functionality to monitor inactive user accounts, and disable them.

The custom application audit trail component 40 is utilized to log user actions and transactions with external applications. Component 40 includes system logic that is used to record the date, time, identifying user/external application information and specific data transactions that create, update or delete case management information.

The custom archive manager component 42 is utilized for data archiving and archived data reporting. Component 42 contains system logic used to archive system information either "on demand" (manual) or "as scheduled" (automatic). Thus, the command to archive data can be a user or a temporal trigger. Component 42 may also be configured to archive data to various backup options (e.g., database, files, etc.) using various formats.

The utility application components 44, 46, 48 and 50 are low level components that are used to manage communications, database interfaces, operating system commands, files/directories, data containers, etc. The communication management component 44 contains system logic that implements popular communication protocols (e.g., SMTP/e-mail, Web/HTTP/HTTPS, FTP, etc.). Component 44 uses low level logic that allows the application to send e-mail messages as well as communicate with the end user's browser via HTTP or secure HTTP (128 bit), push or pull ASCII or binary files via FTP, send facsimiles to remote fax machines, provide telephony services, etc.

The database interface component 46 provides components to read and write data from and to various data sources via widely used database connectivity protocols, such as ODBC, JDBC, etc.

The file and OS utilities component 48 is utilized for file I/O and OS file management. Component 48 includes system logic that is used to interact with directories and files contained within the underlying operating system. The logic incorporated into component 48 allows for the creating, reading, updating and deleting of system directories and files.

The external application interface component 50 is utilized for interfacing with external applications. Component 50 includes system logic that utilizes functionality from components 44, 46 and 48 to interact with external systems and applications.

The bottom layer of the inventive framework 10 is the customized application layer 16, which contains specialized application components that customize (by overriding and/or extending) any of the basic functionality provided by the toolkit 10 concrete components to meet specific functional or non-functional requirements for a target business/user base. This layer acts as a placeholder for application specific components that are created when a case management application is built using the layers above it.

The inventive toolkit 10 thus provides a framework where components work collaboratively to provide essential case management functions. The various layers are vertically oriented, such that the operation and functionality of one layer depends on the layers below it. Further, changes to one layer will not impact the performance of any layers below it. The various layers and components are customizable by a developer, using object-oriented techniques, to design a custom case management application to suit a particular business's needs.

Figure 3B:
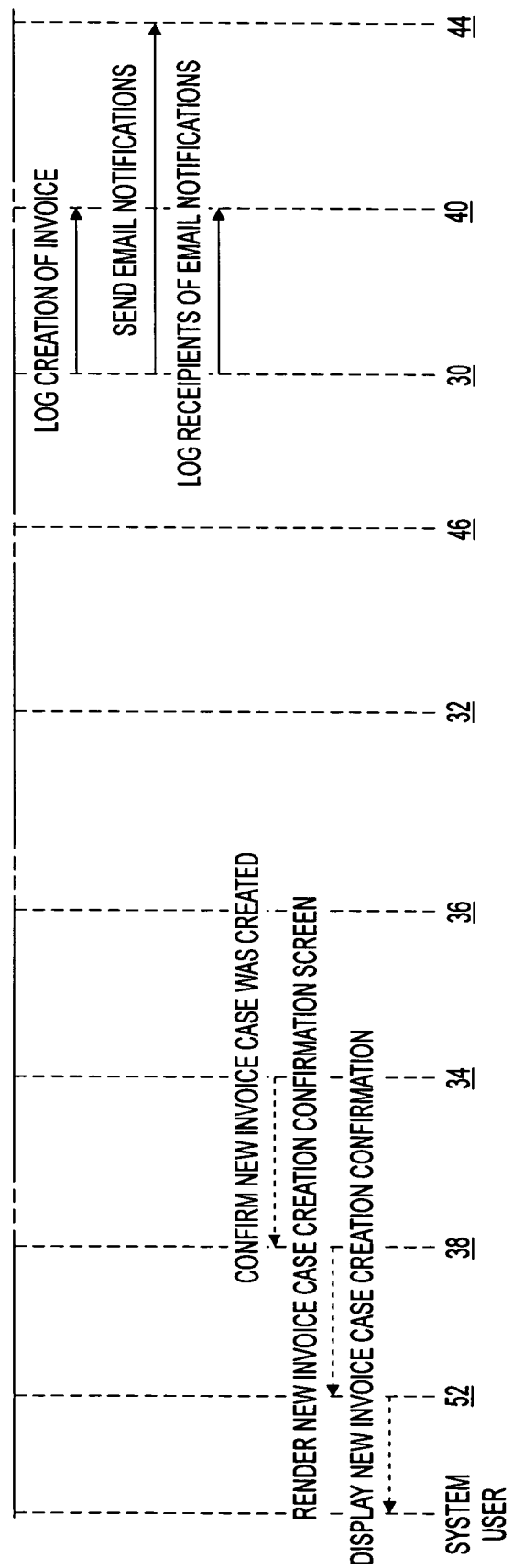
FIG. 3 is a sequence diagram illustrating a new invoice case submission example involving the major layers of the toolkit of the present invention.

FIG. 3 illustrates (using a unified modeling language sequence diagram) how various of the toolkit layers interact with one another to perform a case type specific business task. In the example of FIG. 3, the various toolkit 10 layers are used to submit a new invoice case and notify the receiving officer that the new invoice is awaiting his/her review and payment recommendation.

As shown in FIG. 3, a user selects to create a new invoice case, via a system interface 52 (which is typically a Graphical User Interface), and the custom application user management component 38 authorizes the user's request and renders creation of an invoice screen (assuming the user is authorized). The create invoice screen is displayed to the user via the system interface 52, and the user then submits invoice case information. The custom application user management component 38 authorizes the user's request and, assuming the user is authorized, continues creating a new invoice case via the custom case management processes component 34. The custom application data management component 36 validates invoice case information and, assuming the data is valid, the custom case management processes component 34 continues processing. The custom e-business and case management objects component 32 populates the invoice case objects, while the database interface component 46 commits the new invoice case to the backend database. The custom workflow management component 30 updates the invoice case status to "new". The custom application audit trail component 40 logs the creation of the invoice, and the communications management component 44 sends e-mail notifications (e.g., to the receiving officer and the submitting user). The custom application audit trail component 40 also logs the recipients of the e-mail notifications sent by the communications management component 44. The custom application user management component 38 confirms that a new invoice case was created, and the new invoice case creation confirmation screen is rendered to the system user via the system interface 52. This is but one case management function that is achievable with the inventive toolkit 10.

The inventive toolkit 10 provides the framework where the various components can work collaboratively to provide essential case management functions. The inventive toolkit 10 not only provides "concrete" components that can meet specific case management process and requirements "as is", but also provides "abstract" components that can be customized to develop new components. Thus, the inventive toolkit's multi-tier layered architecture enables a custom case management application to be developed by integrating various components, each of which can be either: (a) an existing "concrete" toolkit component used "as is"; (b) a new component developed by customizing one of the inventive toolkit's "abstract" components; or (c) an acquired "off-the-shelf" component. The following description uses examples to explain the above three mechanisms for using the inventive toolkit 10 to develop a custom case management software application.

Using Existing Toolkit Components

The case types, actions/events, status/states and user roles are user defined and represented as configurable components within the toolkit 10. Case types (invoice, bankruptcy, medical, etc.) have associated states or statuses (new, review, approved, closed, etc.). For each case type and status combination, the developer associates an action to be performed against the case. For example, in an invoice <case type> case management system, a receiving officer <user role> can review the invoice and recommend that the invoice be paid <action>. The toolkit can be customized so that the receiving officer can only perform this action on newly submitted invoices <status>.

Figure 4:
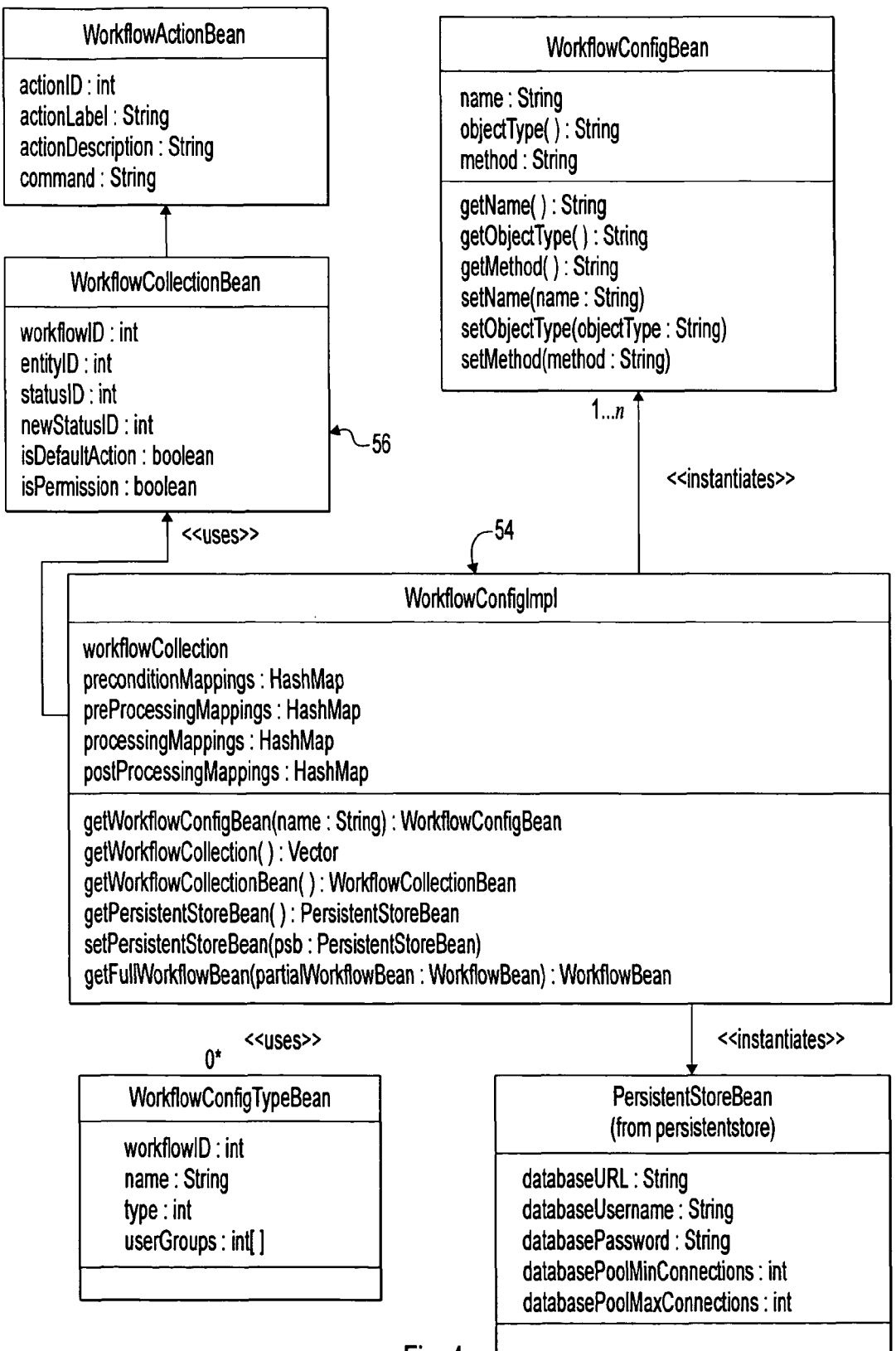
FIG. 4 is a class diagram of a collection of workflow related components of the toolkit of the present invention.
Figure 5:
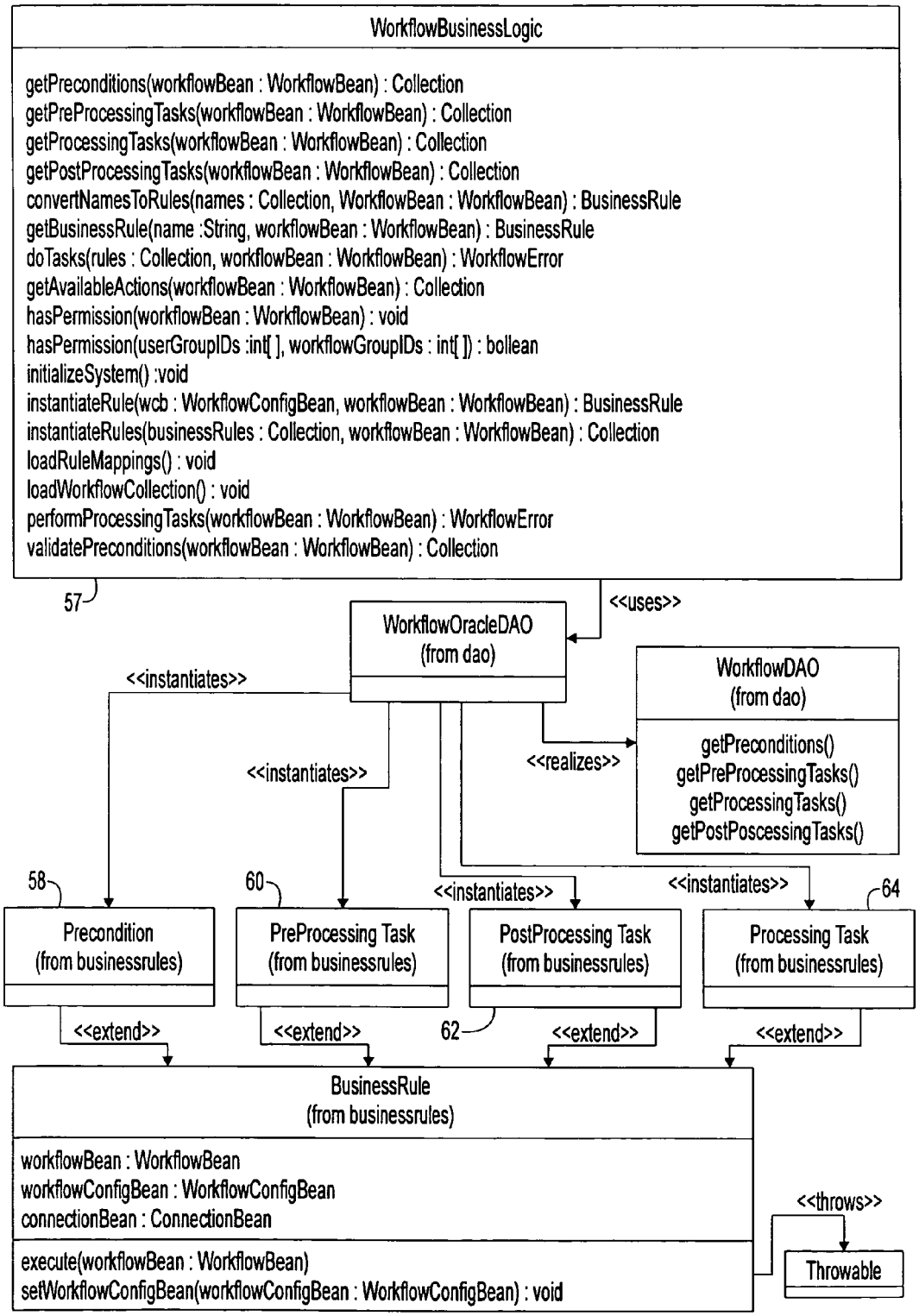
FIG. 5 is a class diagram of a collection of workflow related components of the toolkit of the present invention.

Combinations of the case type, action and status, along with the user rules of which have permissions to perform the actions, are defined as "workflow" components within the toolkit 10. The class diagrams shown in FIG. 4 and FIG. 5 show some of the configurable components used by an application developer to define custom workflows. For instance, when a developer defines an action, they can also define the associated business logic that is performed when the action occurs. Specific workflow components shown in FIG. 4 and FIG. 5 are described herein to highlight the specific functionality that each one provides. For instance, the WorkflowConfigImpl class 54 is used to maintain the set of several WorkflowCollectionBean objects 56, each of which contains a unique mapping between the case type (entity ID), action (action ID) and state/status (status ID). Thus, the WorkflowConfigImpl class 54 represents the entire workflow logic for the case management application.

The business logic associated with an action is defined as a WorkflowBusinessLogic component 57, which is a combination of a precondition task, a preprocessing task, a processing task a post-processing task. The toolkit 10 provides abstract components (precondition 58, pre-processing task 60, post-processing task 62 and processing task 64), that can be inherited by custom concrete business rules for a specific, custom case management system, as shown in FIG. 5.

Figure 6C:
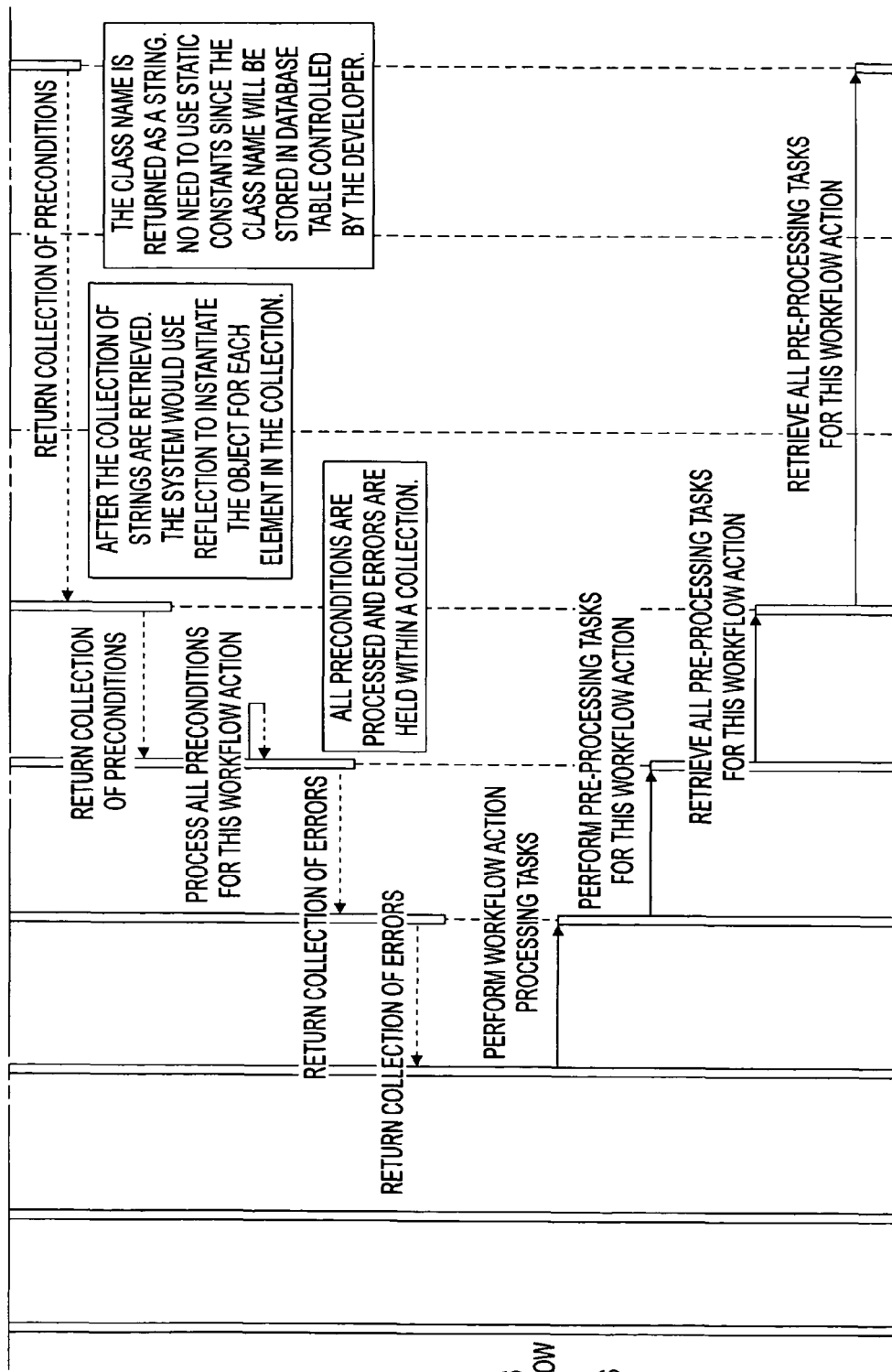
FIG. 6 is a sequence diagram illustrating how various toolkit components of the present invention collaboratively perform the business logic associated with the new invoice case submission example of FIG. 3.
Figure 6D:
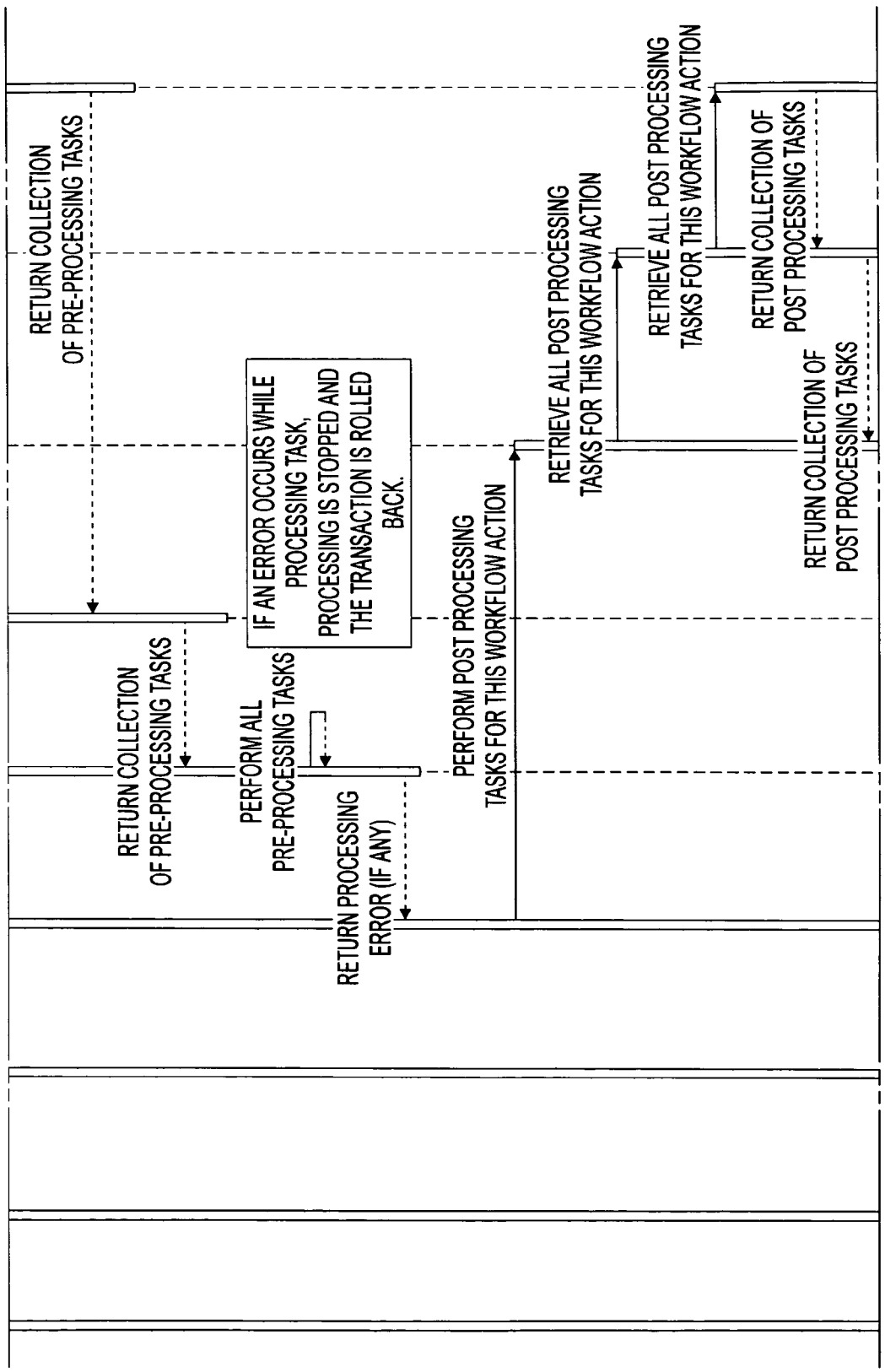
Figure 6E:
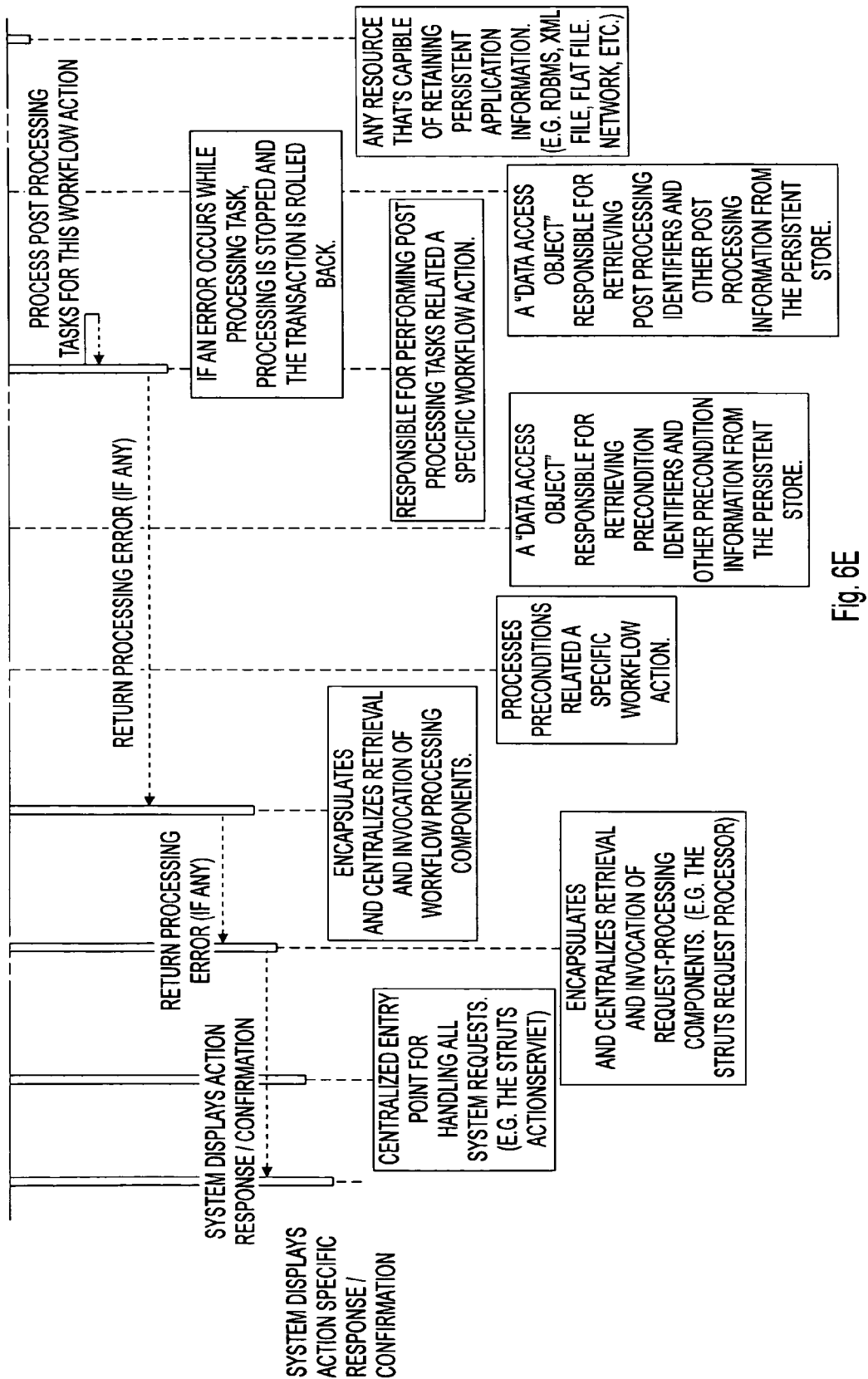

The sequence diagram of FIG. 6 represents how the inventive toolkit 10 would perform the business logic associated with the new invoice case submission example illustrated in FIG. 3. It may be noted that FIG. 6 depicts "implementation" level components, such as the Front Controller, that are not relevant to the discussion here. The various elements identified at the top of FIG. 6 perform the associated functionality set forth at the bottom of FIG. 6 for each respective element. Initially, the receiving officer reviews and recommends that an invoice be paid. The toolkit 10 first retrieves the user defined preconditions associated with the "recommend payment" action. Using polymorphism, the toolkit 10 executes any specific precondition business rules. In the present example, the only precondition is that the invoice must have a status of "new" before an action can be performed. Next, the preprocessing, processing and post-processing tasks are performed, as illustrated and described in FIG. 6. Again, the toolkit 10 retrieves the business rules and uses polymorphism to execute the user defined business logic. In the present example, the following tasks would typically occur:

Lock the invoice so nobody else can modify it (preprocessing).
Update the invoice status to "recommended for payment" (processing).
Unlock the invoice (post-processing).
Send an e-mail notification to the "contract administrator" requesting that they "approve" the invoice for payment (post-processing).
Log the username, invoice number, action, date and time the action was performed (post-processing).

Customizing Toolkit Components

Figure 7A:
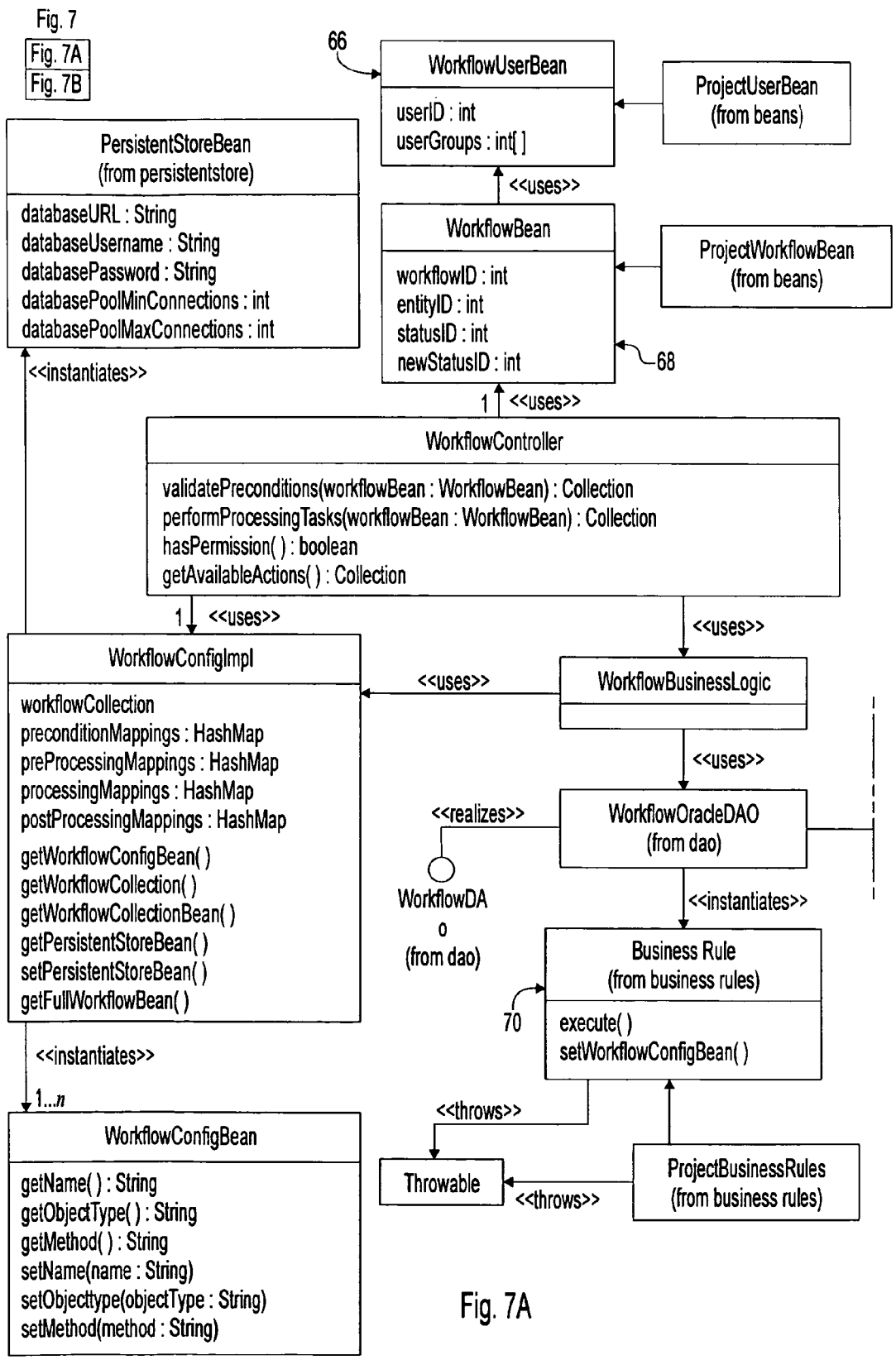
FIG. 7 is a class diagram of a collection of user-extendable components of the toolkit of the present invention.
Figure 7B:
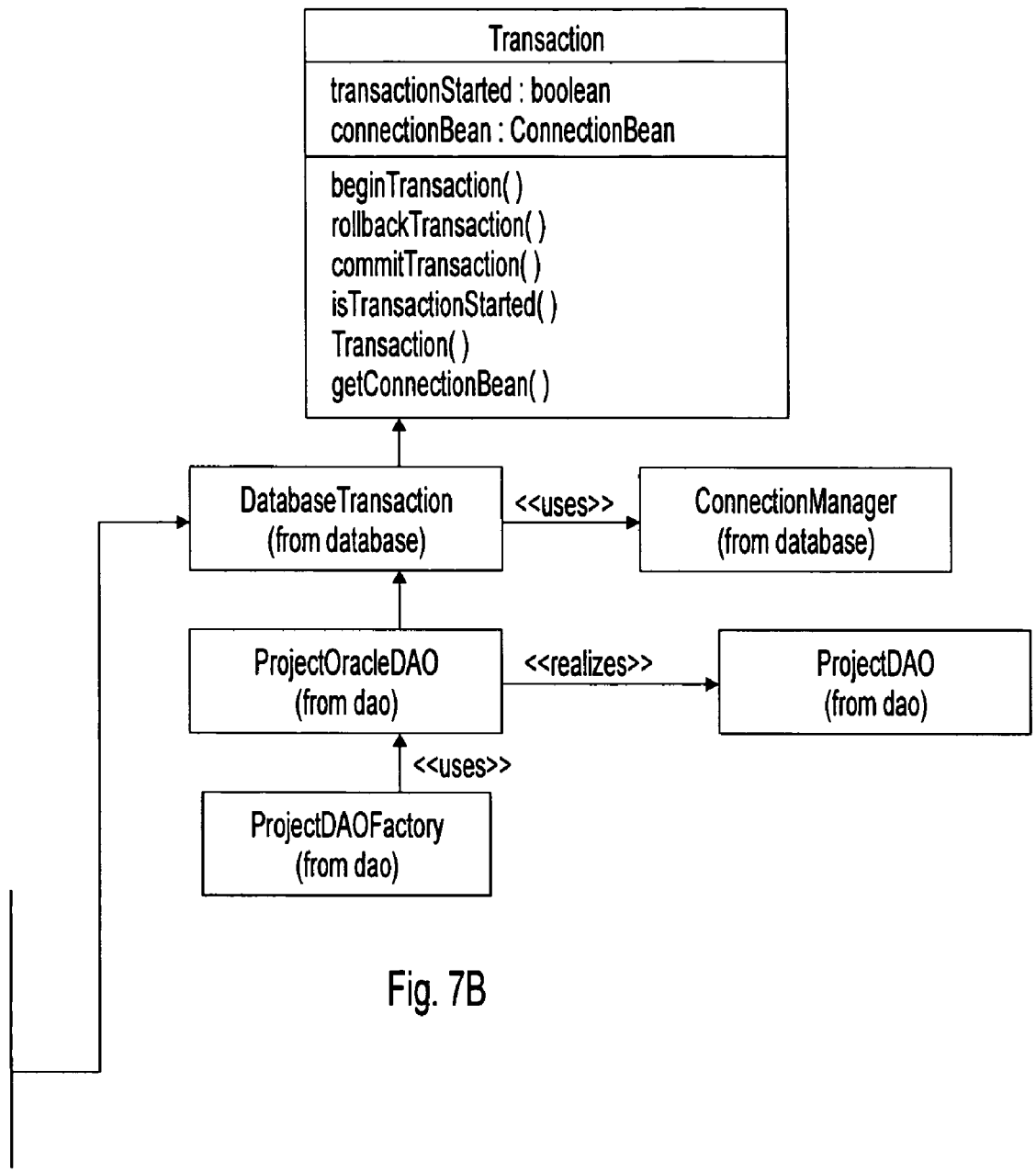

The inventive toolkit 10 is designed for easy expansion and customization. Typically, as shown in FIG. 7, attributes and business logic are customized for the user at <WorkflowUserBean> 66, workflow <WorkflowBean> 68 and business rule <BusinessRule> 70 objects. User attributes required by the toolkit 10 are contained within the WorkflowUserBean 66 object and include the user identifier and the roles/groups in which the user is a member. Additional user attributes required by the custom case management system, such as first name, last name, organization, department, etc., can be added by subclassing the WorkflowUserBean 66 class.

In the above description, it was explained that abstract precondition 58, pre-processing task 60, post-processing task 62 and processing task 64 components can be expanded to create customer concrete business rules. When the abstract components are subclassed, the execute method is implemented within the custom business logic. During runtime, the business rules are executed in order by their type (e.g., precondition, pre-processing, post-processing and processing). For business rules of the same type, the order of execution is based on a user defined sequence order.

Similar to expanding the user attributes, additional workflow attributes required by the custom business rules can be added by expanding the WorkflowBean 68 class. The most common attribute added to the WorkflowBean 68 object is an identifier of the specific case type being processed. For example, the invoice identifier or the entire customer invoice business object may be added to the WorkflowBean 68 object so that the customer "Update Invoice Status" business rule knows which invoice should be updated.

Integrating "Off-The-Shelf" Components

The inventive toolkit 10 implements the abstract factory design pattern to allow for easy integration of the toolkit 10 with most any OTS RDBMS (Relational Database Management System) or custom data store (XML, Web Services, Flat Files, serialization, etc.). The inventive toolkit 10 provides "concrete" components (components that can be used "out-of-the-box", without the need for customization) to access, for example, Oracle and Microsoft SQL servers (6.5, 7.0, 2000 and 2005). Integrating the toolkit 10 with other COTS RDBMS or custom data stores is accomplished by the following steps.

The first step is to create a concrete class that implements the WorkflowDAO interface, which defines how to establish and operate an interface with an underlying OTS database. The next step is to extend the DAO Factory Class by providing a getWorkflowDAO method that returns the concrete class created in step 1 (as shown in FIG. 8), and modify the switch statement to include the new data store type (as shown in FIG. 9). The third step is to modify the toolkit configuration file to use the new data store DAO and database driver (as shown in FIG. 10).

INDUSTRIAL APPLICABILITY

In an increasingly paperless and automated world, the concept of "case management" is finding application outside the legal and medical fields. The case management software application market is comprised of various vertical segments, many of which are summarized in the table below.

| Case Management Software Vertical Markets | Case Management Software User Base |
|---|---|
| Medical | Doctors, Hospitals, National Health Institutes, Federal Agencies such as the Department of Homeland Security |
| Legal Foreclosures Bankruptcy Cases Evictions | U.S. Courts, Law Firms, Lawyers |
| Financial/Purchasing Invoices Loans Procurement | Accounts Payable Divisions, Banks/Lending Institutions, Procurement Divisions |
| Investigative Background Checks | Federal Agencies such as Department of Justice and the Federal Bureau of Investigation, Defense Security Service, Department of Homeland Security, etc. |

The inventive toolkit 10 provides a foundation for the rapid development of custom, complex and robust case management software applications for the various markets identified above, as well as others. The inventive toolkit 10 does not provide an out-of-the-box case management software application, but rather provides an integration framework that enables developers to use, customize and integrate the inventive toolkit's software components with other off-the-shelf components to develop a custom case management software application.

Utilizing the present invention, software developers can focus almost exclusively on meeting the specific case management needs of a specific business/enterprise. This enables end user needs to be met without increasing implementation costs associated with: (a) changing current business processes and information systems to manage cases by adopting a Commercial Off-The Shelf (COTS) software; and/or (b) sponsoring the modification of a COTS software product to support current business processes and information systems.

While the present invention has been described with particular reference to the drawings, it should be understood that various modifications could be made without departing from the spirit and scope of the present invention.

The following set of claims is not limiting, but is merely exemplary of preferred aspects of the present invention. It is to be understood that the present patent application instead covers all aspects of the present invention as shown and described herein.

We claim:

1. An application framework for computer implemented development of custom case management software applications comprising:
    an enterprise application layer having components providing administration, security and communications capabilities;
    a case management application layer having components providing case management business classes and processing and workflow capabilities; and
    a customized application layer having components providing specialized application components capable of overriding or expanding functionality of other components in a customized case management software application, wherein the case management application layer comprises:
        a business application layer having components providing case management workflows, business entities and processing capabilities;
        a generic application layer having components providing application data management, user management, application action auditing and data archiving capabilities; and a utility layer having components providing communication handling, database interface and external application interface capabilities, and wherein the generic application layer comprises:
- a custom application data management component providing capabilities selected from the group consisting of custom data input, integration/synthesis, validation, transformation, querying/searching and report generation and administration;
- a custom application user management component providing capabilities selected from the group consisting of user interface, user sessions, user access control and user authentication;
- a custom application audit trail component providing capabilities for logging user actions and transactions with external systems; and
- a custom archive manager component providing data archiving and archived data reporting capabilities.

2. The application framework of claim 1, wherein the business application layer comprises:
- a custom workflow management component providing case scheduling capabilities;
- a custom e-business and case management objects component providing case administration capabilities; and
- a custom case management processes component providing system operation/ administration and case management capabilities.

3. The application framework of claim 2, wherein the custom workflow management component schedules, tracks and manages actions and events.

4. The application framework of claim 2, wherein the custom workflow management component generates reminders alerting users of upcoming events.

5. The application framework of claim 2, wherein the custom e-business and case management objects component includes centralized business logic specific to casemanagement.

6. The application framework of claim 5, wherein the centralized business logic includes (a) conditions for generating messages, warnings and errors, (b) summing totals and counts; (c) maintaining links between cases and related case data, and (d) controlling business transactions and handling exceptions when a transaction fails.

7. The application framework of claim 2, wherein the custom case management processes component includes representations of scheduled as well as event-driven processes related to: (a) case data submission, editing and closing; (b) various scheduled system maintenance and administrative events, such as data backups, monitoring activity of user sessions, etc.; (c) communication processes; and (d) external system interface processes.

8. The application framework of claim 7, wherein communication processes comprises periodic generation of e-mail notifications.

9. The application framework of claim 7, wherein external system interface processes comprises periodic synchronization of data with an external database 10. The application framework of claim 1, wherein the custom application user management component includes graphical interface template functionality allowing the user interface to be divided into smaller sub-screens which are individually managed.

11. The application framework of claim 1, wherein the custom application user management component includes user session management functionality which tracks users logging into and out of the case management application, how long a user was logged into the case management application, and manages memory specific to an individual user's session.

12. The application framework of claim 1, wherein the custom application user management component includes access control functionality to manage what data and functionality users may access with the case management application.

13. The application framework of claim 1, wherein the custom application user management component includes authentication framework functionality which authenticates users or external systems based on certificates and/or user name/password pairs.

14. The application framework of claim 1, wherein the custom application user management component includes functionality to monitor inactive user accounts and disable them.

15. The application framework of claim 1, wherein the custom application audit trail component includes system logic used to record a date, time, identifying user/external application information and data transactions 16. The application framework of claim 1, wherein the custom archive manager component archives data to numerous sources using various formats.

17. The application framework of claim 1, wherein the utility layer comprises:
- a communication management component providing messaging capabilities selected from the group consisting of e-mail, facsimile and telephony;
- a database interface component providing capabilities for reading and writing data from and to various data sources;
- a file and OS utilities component providing file management capabilities; and
- an external application interface component providing capabilities for interfacing with external applications.

18. The application framework of claim 17, wherein the database interface component reads and writes data using ODBC or JDBC protocols.

19. The application framework of claim 17, wherein the file and OS utilities component includes system logic used to interact with directories and files contained within an underlying operating system.

20. The application framework of claim 17, wherein the external application interface component includes system logic that utilizes functionality from the communication management component, the database interface component and the file and OS utilities component to interact with external systems and applications.

21. The application framework of claim 1, wherein the various layers of the application framework are customized using object-oriented techniques.

22. The application framework of claim 1, wherein the customized case management software application is selected from the group consisting of an invoice case management system, a medical case management system and a bankruptcy case management system.

23. The application framework of claim 1, wherein the various layers are vertically oriented such that the operation and functionality of one layer depends on the layers below it, and wherein the enterprise application layer comprises a top layer, the case management application layer comprises a middle layer and the customized application layer comprises a bottom layer.

24. The application framework of claim 23, wherein changes to one layer do not impact the performance of any layers below it.

25. The application framework of claim 1, wherein the various layers are vertically oriented such that the operation and functionality of one layer depends on the layers below it, wherein the enterprise application layer comprises a top layer, the case management application layer comprises a middle layer and the customized application layer comprises a bottom layer, and wherein within the case management application layer business application layer comprises a top layer, the generic application layer comprises a middle layer and the utility layer comprises a bottom layer.

* * * * *